(12) United States Patent
Park et al.

(10) Patent No.: US 11,651,900 B2
(45) Date of Patent: May 16, 2023

(54) MULTILAYER ELECTRONIC COMPONENT HAVING MOISTURE-PROOF LAYER ON BODY THEREOF

(71) Applicant: SAMSUNG ELECTRO-MECHANICS CO., LTD., Suwon-si (KR)

(72) Inventors: Chae Min Park, Suwon-si (KR); Ji Hong Jo, Suwon-si (KR); Woong Shin, Suwon-si (KR); Jae Hyun Lee, Suwon-si (KR); Hyun Woo Seung, Suwon-si (KR); Woo Chui Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 254 days.

(21) Appl. No.: 16/834,243

(22) Filed: Mar. 30, 2020

(65) Prior Publication Data

US 2021/0090806 A1 Mar. 25, 2021

(30) Foreign Application Priority Data

Sep. 20, 2019 (KR) ........................ 10-2019-0115902

(51) Int. Cl.
*H01G 4/30* (2006.01)
*H01G 4/012* (2006.01)
(Continued)

(52) U.S. Cl.
CPC ............. *H01G 4/30* (2013.01); *C04B 35/468* (2013.01); *H01G 2/02* (2013.01); *H01G 4/012* (2013.01);
(Continued)

(58) Field of Classification Search
CPC ........ H01G 4/30; H01G 4/012; H01G 4/1218; H01G 4/232; H01G 4/005; H01G 4/12;
(Continued)

(56) References Cited

U.S. PATENT DOCUMENTS 9,328,026 B2 5/2016 Okajima et al.
10,672,559 B2 * 6/2020 Inomata ................... H01G 4/12
(Continued)

FOREIGN PATENT DOCUMENTS

CN 103915253 A 7/2014
CN 105374555 A 3/2016
(Continued)

OTHER PUBLICATIONS

Gisele Azimi et al., "Hydrophobocity of rare-earth oxide ceramics", Nature Materials, vol. 12, Apr. 2013, pp. 315-320.
(Continued)

*Primary Examiner* — David M Sinclair
*Assistant Examiner* — Daniel M Dubuisson
(74) *Attorney, Agent, or Firm* — Morgan, Lewis & Bockius LLP (57) ABSTRACT

A multilayer electronic component includes a body including dielectric layers and first and second internal electrodes alternately laminated with respective dielectric layers interposed therebetween, and first and second surfaces opposing each other in a direction by which the internal electrodes are laminated, third and fourth surfaces connected to the first and second surfaces and opposing each other, and fifth and sixth surfaces connected to the first to fourth surfaces and opposing each other; a moisture-proof layer disposed on at least one surface of anyone of the first, second, fifth, or sixth surface and containing a rare-earth oxide; a first external electrode disposed on the third surface and connected to the first internal electrodes; and a second external electrode
(Continued)

disposed on the fourth surface and connected to the second internal electrodes.

30 Claims, 7 Drawing Sheets

(51) Int. Cl.
 *H01G 4/12* (2006.01)
 *H01G 2/02* (2006.01)
 *C04B 35/468* (2006.01)
(52) U.S. Cl.
 CPC ... *H01G 4/1218* (2013.01); *C04B 2235/3225* (2013.01)
(58) Field of Classification Search
 CPC . H01G 4/224; H01G 2/02; H01G 5/14; C04B 35/468; C04B 2235/3225; C04B 2237/34; C04B 2237/346; C04B 2237/348; C04B 2237/704; C04B 2237/80; B32B 18/00
 See application file for complete search history.

(56) References Cited

U.S. PATENT DOCUMENTS

| | | | | |
|---|---|---|---|---|
| 2013/0063862 | A1* | 3/2013 | Kim | H01G 4/30 156/182 |
| 2014/0185185 | A1* | 7/2014 | Okajima | C04B 37/001 361/301.4 |
| 2015/0380165 | A1* | 12/2015 | Oguni | C04B 37/003 156/89.18 |
| 2016/0003737 | A1* | 1/2016 | Shimada | H01G 4/1209 414/816 |
| 2016/0049256 | A1 | 2/2016 | Kitano et al. | |
| 2016/0172108 | A1* | 6/2016 | Ikeda | H01G 4/2325 361/301.4 |
| 2018/0025845 | A1* | 1/2018 | Sato | H01G 2/103 361/321.2 |
| 2018/0166219 | A1 | 6/2018 | Noda et al. | |
| 2018/0218958 | A1* | 8/2018 | Suga | H01G 4/30 |
| 2018/0240592 | A1* | 8/2018 | Morita | H01G 4/12 |
| 2018/0261389 | A1* | 9/2018 | Sakate | H01G 4/248 |
| 2018/0286594 | A1 | 10/2018 | Kim et al. | |
| 2019/0115148 | A1* | 4/2019 | Nomura | H01G 4/12 |
| 2019/0131076 | A1* | 5/2019 | Fukumura | H01G 4/008 |
| 2019/0355519 | A1* | 11/2019 | Taniguchi | H01G 4/228 |
| 2020/0035416 | A1* | 1/2020 | Kwon | H01G 4/30 |
| 2020/0402718 | A1* | 12/2020 | Oosawa | H01G 4/2325 |
| 2020/0411246 | A1* | 12/2020 | Yao | H01G 4/224 |

FOREIGN PATENT DOCUMENTS

| | | | |
|---|---|---|---|
| CN | 108231413 A | | 6/2018 |
| JP | 2010050263 | * | 3/2010 |
| JP | 2010050263 A | * | 3/2010 |
| JP | 2018170526 A | * | 11/2018 |
| KR | 10-2017-0070668 A | | 6/2017 |
| KR | 10-2018-0112643 A | | 10/2018 |

OTHER PUBLICATIONS

Chinese Office Action dated Jul. 26, 2022, issued in corresponding Chinese Patent Application No. 202010449063.0 (with English translation).

* cited by examiner

MULTILAYER ELECTRONIC COMPONENT HAVING MOISTURE-PROOF LAYER ON BODY THEREOF

CROSS-REFERENCE TO RELATED APPLICATION(S)

This application claims benefit of priority to Korean Patent Application No. 10-2019-0115902 filed on Sep. 20, 2019, in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a laminated chip electronic component, is a chip-type condenser installed on a printed circuit board (PCB) of various electronic products such as imaging devices (or video apparatuses) like liquid crystal displays (LCDs), plasma display panels (PDPs), and the like, computers, smartphones, portable phones, and the like, to charge and discharge electricity.

Due to advantages of a miniaturized size and high capacity as well as ease of mountability, such MLCCs can be used as a component of various electronic devices.

Further, as interest in automotive electronic components has recently been increasing, MLCCs have also been required to have high reliability and high mechanical strength so as to be able to be used in automotive or infotainment systems.

In particular, as occurrences of chip cracking, breakdown due to moisture penetration, and the like, are regarded as fatal defects, in consideration of an environment in which the automotive electronic components are used, a method to secure higher moisture resistance reliability is required.

In addition, there is a problem in terms of degraded performance or reliability along with thinning in an existing method and, thus, there has been increasing need for a new method of resolving such problems.

SUMMARY

An aspect of the present disclosure is to improve moisture resistance reliability.

Another aspect is to secure high capacitance.

However, the above aspects are not limited to the previous descriptions and will be more clearly understood from the following embodiments.

According to an embodiment in the present disclosure, a multilayer electronic component includes a body including dielectric layers and first and second internal electrodes alternately laminated with respective dielectric layers interposed therebetween, and first and second surfaces opposing each other in a direction by which the internal electrodes are laminated, third and fourth surfaces connected to the first and second surfaces and opposing each other, and fifth and sixth surfaces connected to the first to fourth surfaces and opposing each other; a moisture-proof layer disposed on at least one surface of anyone of the first, second, fifth, or sixth surface and containing a rare-earth oxide; a first external electrode disposed on the third surface and connected to the first internal electrodes; and a second external electrode disposed on the fourth surface and connected to the second internal electrodes.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will now be described in detail with reference to the accompanying drawings. The present disclosure, however, may be embodied in many different forms and should not be construed as being limited to the embodiments set forth herein. Rather, these embodiments are provided so that this disclosure will be thorough and complete, and will fully convey the scope of the invention to those skilled in the art. Accordingly, the shapes and dimensions of elements in the drawings may be exaggerated for clarity, and the same reference numerals will be used throughout to designate the same or like elements.

A thickness and a size of each layer shown in the drawings may be exaggerated, omitted or schematically drawn for the purpose of convenience or clarity. The same reference numbers will be assigned the same elements throughout the drawings. Further, in the specification, when a certain part "includes" a certain component, it is understood that other components may be further included but are not excluded, unless otherwise specifically indicated.

In the drawings, a "X direction" may be defined as a "second direction", an "L direction" or a "length direction", and a "Y direction" may be defined as a "third direction", a "W direction" or a "width direction", while a "Z direction" may be defined as a "first direction", a "lamination direction", a "T direction" or a "thickness direction".

Multilayer Electronic Component

Figure 1:
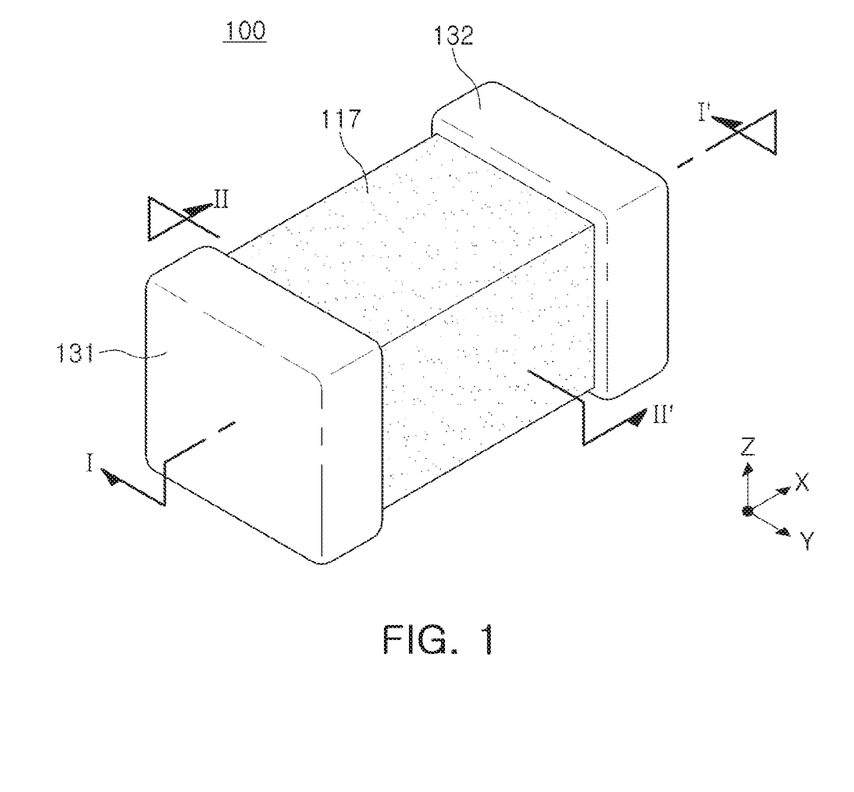
FIG. 1 is a perspective view schematically illustrating a multilayer electronic component according to an embodiment of the present disclosure.
Figure 2:
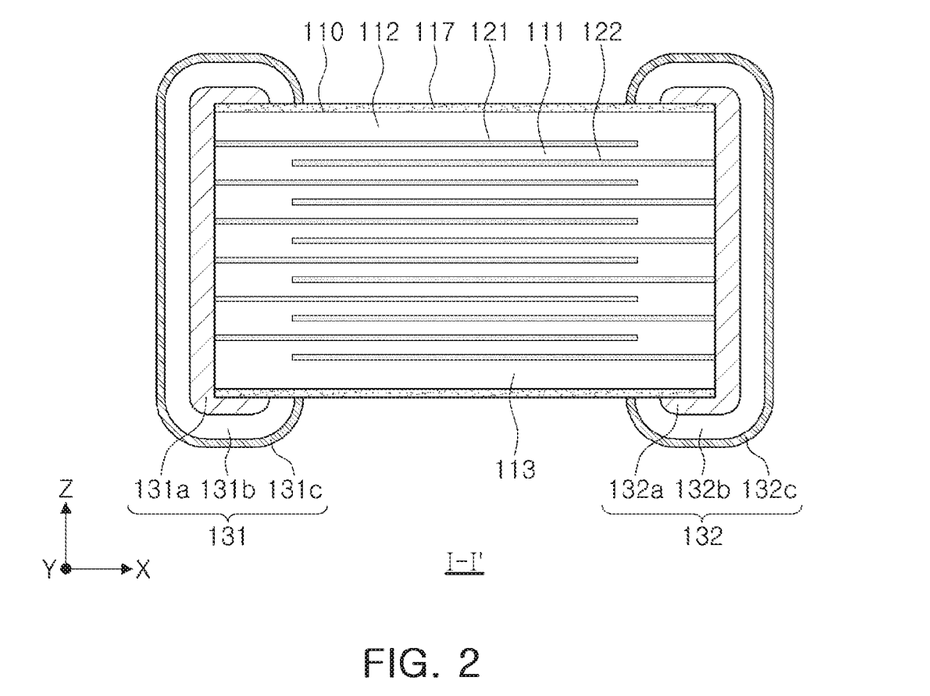
FIG. 2 is a cross-sectional view of line I-I' of FIG. 1.
Figure 3:
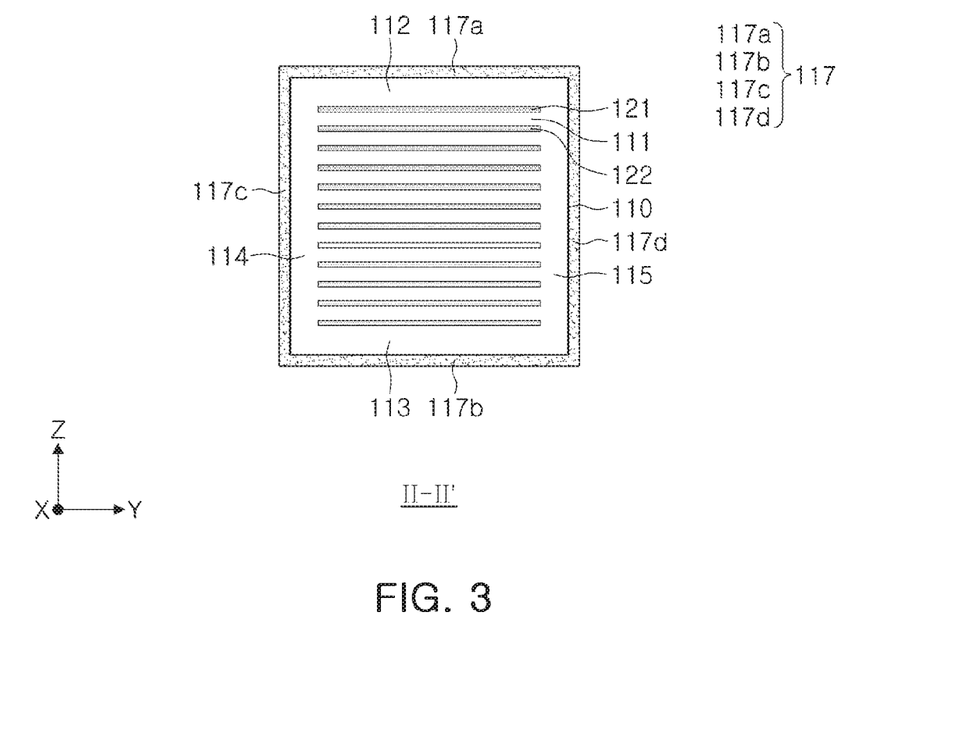
FIG. 3 is a cross-sectional view of line II-II' of FIG. 1.
Figure 4:
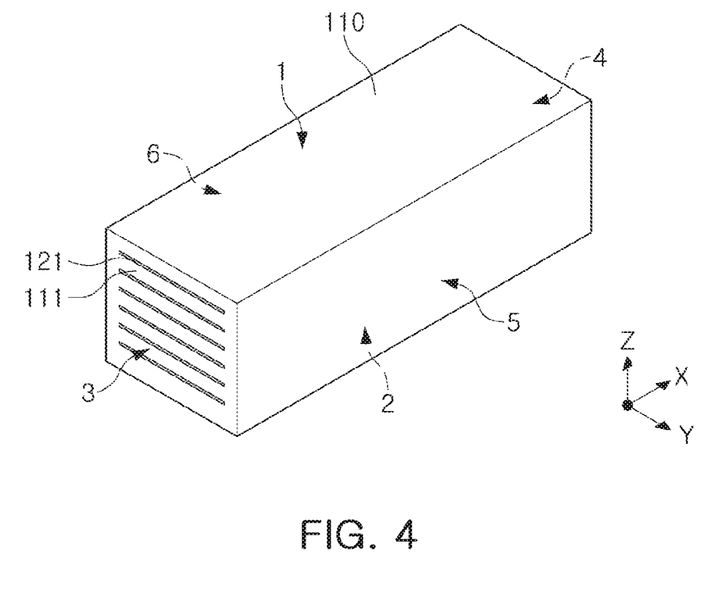
FIG. 4 is a perspective view schematically illustrating a body of FIG. 1.

FIG. 1 is a perspective view schematically illustrating a multilayer electronic component according to an embodiment of the present disclosure, and FIG. 2 is a cross-sectional view of line I-I' of FIG. 1, while FIG. 3 is a cross-sectional view of line II-II' of FIG. 1, and FIG. 4 is a perspective view schematically illustrating a body of FIG. 1.

Figure 5:
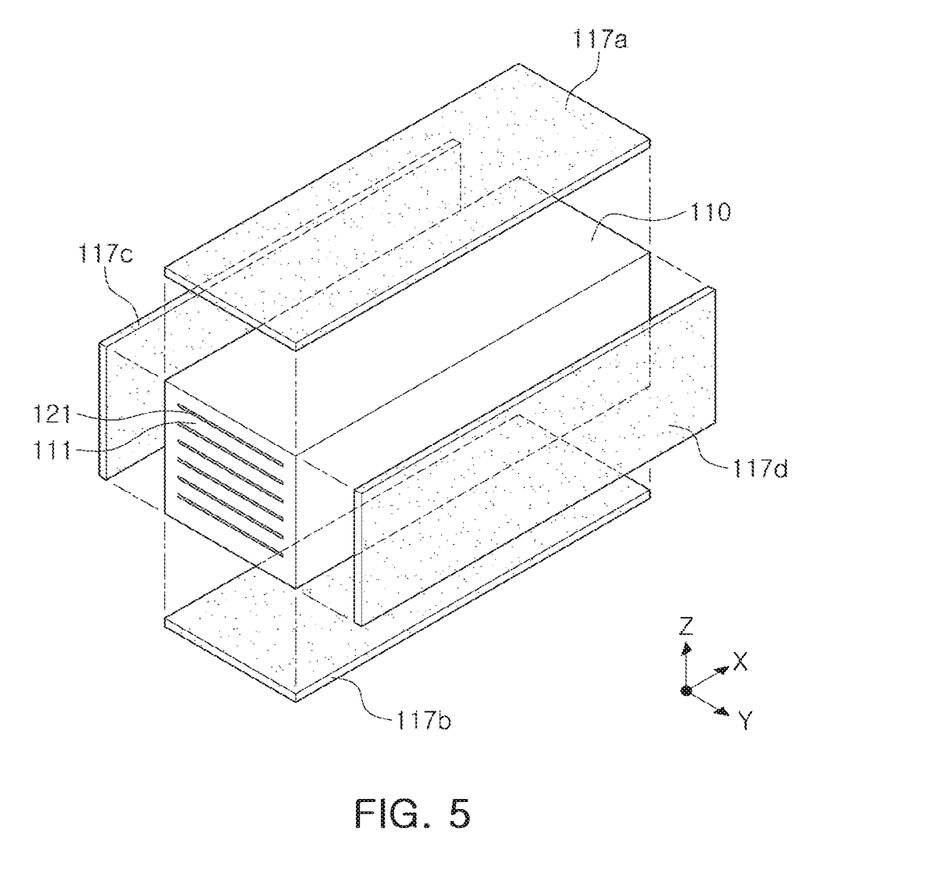
FIG. 5 is a diagram illustrating a process of forming a moisture-proof layer in the body.

FIG. 5 is a diagram illustrating a process of forming a moisture-proof layer in the body.

Figure 6:
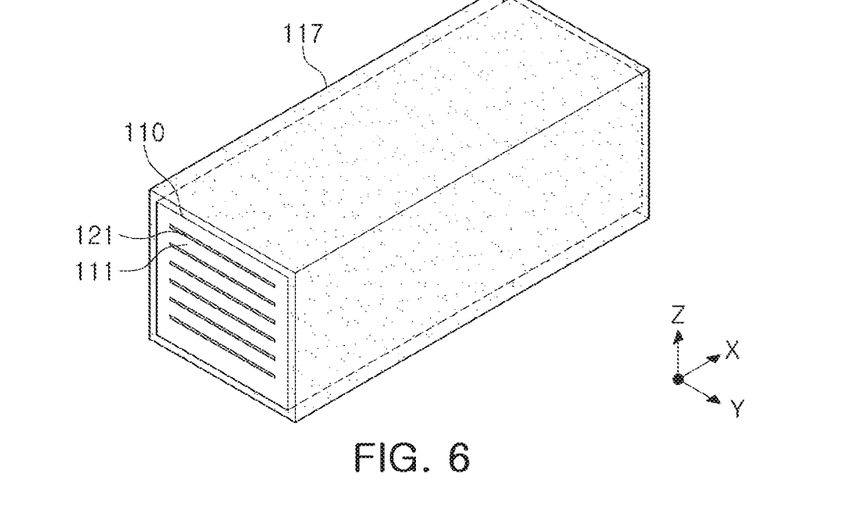
FIG. 6 is a diagram illustrating the body of FIG. 1, in which the moisture-proof layer is formed.

FIG. 6 is a diagram illustrating the body of FIG. 1, in which the moisture-proof layer is formed.

A multilayer electronic component according to an embodiment will be described in detail with reference to FIGS. 1 to 6.

A multilayer electronic component 100 according to an embodiment of the present disclosure includes a body 110 including dielectric layers 111 and first and second internal electrodes 121 and 122 alternately laminated with respective dielectric layers interposed therebetween, and first and second surfaces 1 and 2 opposing each other in a direction by which the internal electrodes are laminated (Z direction), third and fourth surfaces 3 and 4 connected to the first and second surfaces and opposing each other, and fifth and sixth surfaces 5 and 6 connected to the first to fourth surfaces 1 to 4 and opposing each other; a moisture-proof layer 117 disposed on at least one surface of anyone of the first, second, fifth or sixth surface and containing a rare-earth oxide; a first external electrode 131 disposed on the third surface 3 and connected to the first internal electrode; and a second external electrode 132 disposed on the fourth surface 4 and connected to the second internal electrode.

The body 110 includes the first and second internal electrodes 121 and 122, which are alternately laminated.

The body 110 is not particularly limited with respect to its shape, but may have a hexahedral shape as illustrated in the drawings or a shape similar thereto. Due to shrinkage of ceramic powder included in the body 110 during calcination, the body 110 may not have a hexahedral shape with completely straight lines but may have a substantially hexahedral shape.

The body 110 may include first and second surfaces 1 and 2 opposing each other in a thickness direction (Z direction), third and fourth surfaces 3 and 4 connected to the first and second surfaces 1 and 2 and opposing other in a length direction (X direction), and fifth and sixth surfaces 5 and 6 connected to the first and second surfaces 1 and 2 and to the third and fourth surfaces 3 and 4 and opposing each other in a width direction (Y direction).

A plurality of the dielectric layers 111 forming the body 110 are in a calcined state, and may be integrated in a single body such that boundaries between neighboring dielectric layers 111 may not be readily apparent without using a Scanning Electric Microscope (SEM).

According to an embodiment, a material forming the dielectric layers 111 are not limited as long as sufficient capacitance can be obtained therewith, and may be, for example, a barium titanate ($BaTiO_3$)-base material, a lead complex Perovskite-base material, a strontium titanate-base material, or the like. The $BaTiO_3$-base material may include $BaTiO_3$ ceramic powder, and examples of the $BaTiO_3$ ceramic powder are $(Ba_{1-x}Ca_x)TiO_3$, $Ba(Ti_{1-y}Ca_y)O_3$, $(Ba_{1-y}Ca_y)(Ti_{1-y}Zr_y)O_3$, $Ba(Ti_{1-y}Zr_y)O_3$, or the like.

The material forming the dielectric layers 111 may include various ceramic additives, organic solvents, plasticizers, binders, dispersants, or the like, added to the $BaTiO_3$ powder, or the like, according to purpose of the present disclosure.

Meanwhile, a thickness of the dielectric layer 111 is not particularly limited.

However, when a thickness of the dielectric layer is less than 0.6 μm, in particular 0.4 μm or less, moisture resistance reliability may be reduced.

The thickness of the dielectric layer 111 may refer to an average thickness of the dielectric layers 111 disposed between the first and second internal electrodes 121 and 122.

The average thickness of the dielectric layers 111 may be measured by image-scanning a length and thickness (L-T) cross-section of the body 110 with an SEM.

For example, the average thickness may be obtained by measuring thicknesses at 30 equidistant points in the length direction of any dielectric layer extracted from the L-T cross-section image of the body 110, cut through a central portion thereof in the width direction, scanned using an SEM, and then averaging the measured thicknesses.

The thicknesses at the 30 equidistant points may be measured in a capacitance-generating portion, which refers to a region in which the first and second internal electrodes 121 and 122 overlap each other.

The body 110 includes a capacitance-generating portion disposed inside the body 110 and generating capacitance by including the first internal electrode 121 and the second internal electrode 122 disposed to oppose each other with the respective dielectric layer 111 interposed therebetween, and cover portions 112 and 113 formed in an upper portion and a lower portion of the capacitance-generating portion.

The capacitance-generating portion contributes to capacitance generation of the capacitor and may generate capacitance by repeatedly laminating a plurality of the first and second internal electrodes 121 and 122 with the respective dielectric layers 111 interposed therebetween.

The upper cover portion 112 and the lower cover portion 113 may be formed by vertically laminating a single layer or at least two dielectric layers on upper and lower surfaces of the capacitance-generating portion, respectively, and may basically prevent the internal electrodes from being damaged by physical or chemical stress.

The upper cover portion 112 and the lower cover portion 113 do not include internal electrodes and may include the same material as the dielectric layer 111.

Further, the body 110 may include margin portions 114 and 115 disposed on both side surfaces of the capacitance-generating portion, respectively.

The margin portions 114 and 115, as illustrated in FIG. 3, refer to a region between both ends of the first and second internal electrodes 121 and 122 and a boundary surface of the body 110 in a cross-section of the body 110 cut in the W-T direction.

The margin portions 114 and 115 may basically prevent the internal electrodes from being damaged by physical or chemical stress.

The margin portions 114 and 115 do not include internal electrodes and may include the same material as the dielectric layer 111.

A plurality of the internal electrodes 121 and 122 are disposed to oppose each other with respective dielectric layers 111 therebetween.

The internal electrodes 121 and 122 may include the first and second internal electrodes 121 and 122 disposed to oppose each other with respective dielectric layers 111 interposed therebetween.

The first and second internal electrodes 121 and 122 may be exposed to the third and fourth surfaces 3 and 4 of the body 110, respectively.

Based on FIGS. 2 to 4, the first internal electrode 121 may be spaced apart from the fourth surface 4 and exposed through the third surface 3, while the second internal electrode 122 may be spaced apart from the third surface 3 and exposed through the fourth surface 4. A first external electrode 131 is disposed on the third surface 3 to be connected to the first internal electrode 121, and a second external electrode 132 is disposed on the fourth surface 4 to be connected to the second internal electrode 122.

The first and second internal electrodes 121 and 122 may be electrically separated from each other by the dielectric layers 111 disposed therebetween.

The body 110 may be formed by alternately laminating in the thickness direction (Z direction) a dielectric layer 111 on which the first internal electrode 121 is printed and a dielectric layer 111 on which the second internal electrode 122 is printed, followed by calcining the same.

A material forming the first and second internal electrodes 121 and 122 are not particularly limited, and may be a conductive paste containing at least one of nickel (Ni), copper (Cu), palladium (Pd), silver (Ag), gold (Au), platinum (Pt), tin (Sn), tungsten (W), titanium (Ti) and alloys thereof.

A method for printing the conductive paste may be a screen-printing method, a gravure printing method, or the like, but is not limited thereto.

Thicknesses of the first and second internal electrodes 121 and 122 do not need to be particularly limited; however, it is preferable that the thickness of each of the first and second internal electrodes 121 and 122 be 0.4 µm or less so as to easily achieve miniaturization and high capacitance of a multilayer electronic component.

The thickness of the first and second internal electrodes 121 and 122 may refer to an average thickness of the first and second internal electrodes 121 and 122.

The average thickness of the first and second internal electrodes 121 and 122 may be measured by image-scanning an L-T cross-section of the body 110 using an SEM.

For example, the average thickness may be obtained by measuring thicknesses at 30 equidistant points in the length direction of any first and second internal electrodes extracted from the L-T cross-section image of the body 110, cut through a central portion thereof in the width direction, scanned using an SEM, and then averaging the measured thicknesses.

The thicknesses at the 30 equidistant points may be measured in the capacitance-generating portion, which refers to a region in which the first and second internal electrodes 121 and 122 overlap each other.

A moisture-proof layer 117 is disposed on at least any one of the first, second, fifth or sixth surface 1, 2, 5 or 6 and contains a rare-earth oxide.

The moisture-proof layer 117 covers minute pores and cracks to prevent moisture from penetrating into the body through an outer surface of the body. Further, as the moisture-proof layer 117 is water-repellent due to the rare-earth oxide contained therein, the moisture-proof layer 117 can more effectively prevent moisture from penetrating into the body through the outer surface of the body.

A rare-earth oxide has low interactions with water molecules due to its structural characteristics that an outermost electron shell (orbital) thereof reaches an octet state, thereby disabling hydrogen bonding with the water molecules and making the rare-earth oxide hydrophobic. Further, the moisture-proof layer 117, by containing the rare-earth oxide, can not only improve moisture resistance reliability but also inhibit ion migrations, which gives rise to improved reliability.

Conventionally, methods of coating a silicon resin, a fluorinated water repellent, and the like, on a body surface were used to improve moisture resistance reliability. In contrast, the moisture-proof layer 117 according to the present disclosure containing a rare-earth oxide is advantageous in that compared to conventional coating materials such as a silicon resin, a fluorinated water repellent, and the like, the moisture-proof layer 117 has remarkably low moisture permeability and further has excellent binding to the body 110.

The rare-earth oxide is not particularly limited, and may be, for example, one selected from dysprosium oxide ($Dy_2O_3$), cerium oxide ($CeO_2$), praseodymium oxide ($Pr_6O_{11}$), neodymium oxide ($Nd_2O_3$), samarium oxide ($Sm_2O_3$), europium oxide ($Eu_2O_3$), gadolinium oxide ($Gd_2O_3$), terbium oxide ($Tb_4O_7$), holmium oxide ($Ho_2O_3$), erbium oxide ($Er_2O_3$), thulium oxide ($Tm_2O_3$), ytterbium oxide ($Yb_2O_3$), and lutetium oxide ($Lu_2O_3$).

Meanwhile, when the rare-earth oxide is $Dy_2O_3$, it may have an effect of improving compatibility with the body 110, compared to the other rare-earth oxides. In this regard, it may be more preferable that the rare-earth oxide be $Dy_2O_3$.

A thickness of the moisture-proof layer 117 may be at least 100 nm.

When the thickness of the moisture-proof layer 117 is less than 100 nm, moisture resistance reliability may not be sufficiently improved.

An upper limit does not need to be particularly limited for the thickness of the moisture-proof layer 117 and can be determined in consideration of capacitance, a size of the capacitor, and the like. For example, the thickness of the moisture-proof layer 117 may be 100 µm or less.

Meanwhile, a method for forming the moisture-proof layer 117 containing a rare-earth oxide is not particularly limited, and may be, for example, an atomic layer deposition (ALD) method, a molecular layer deposition (MLD) method, a chemical vapor deposition (CVD) method, a sputtering method, or the like.

A more preferable method for forming the moisture-proof layer 117 containing a rare-earth oxide involves preparing the rare-earth oxide in a sheet form and spraying the same on the body 110.

Based on FIGS. 4 to 6, once the body 110 is prepared, sheets containing rare-earth oxides 117a, 117b, 117c and 117d are formed on the body 110 to form a coating layer 117.

A sheet containing the rare-earth oxides may also contain raw materials forming the dielectric layer 111, and various ceramic additives, organic solvents, plasticizers, binders, dispersants, or the like, added to the $BaTiO_3$ powder, or the like, may be added thereto according to purpose of the present disclosure.

The moisture-proof layer 117 containing the same material as the dielectric layers 111 is advantageous in that it may have improved binding force with the body 110 and its shape is easily controlled. In one example, the dielectric layers 111 may not include the rare-earth oxide contained in the moisture-proof layer 117. In this case, among the dielectric layers 111 and the moisture-proof layer 117, the rare-earth oxide may be contained only in the moisture-proof layer 117. In another example, even if the dielectric layers 111 includes the rare-earth oxide contained in the moisture-proof layer 117, a weight percentage of the rare-earth oxide in the dielectric layers 111 with respect to the total weight of the dielectric layers 111 may be less than a weight percentage of the rare-earth oxide in the moisture-proof layer 117 with respect to the total weight of the moisture-proof layer 117.

The external electrodes 131 and 132 are disposed inside the body 110 and are connected to the internal electrodes 121 and 122. As illustrated in FIG. 2, the first and second external electrodes 131 and 132 respectively connected to the first and second internal electrodes 121 and 122 may be included.

For the generation of capacitance, the first and second external electrodes 131 and 132 may be electrically connected to the first and second internal electrodes 121 and 122, respectively, and the second external electrode 132 may be connected to a potential different from that to which the first external electrode 131 is connected.

The first external electrode 131 may be disposed on the third surface 3 to be connected to the first internal electrode 121, and the second external electrode 132 may be disposed on the fourth surface 4 to be connected to the second internal electrode 122.

The first external electrode 131 may extend from the third surface 3 so as to cover a portion of the moisture-proof layer 117, and the second external electrode 131 may extend from the fourth surface 4 so as to cover a portion of the moisture-proof layer 117.

Meanwhile, the external electrodes 131 and 132 may be formed using any material, such as a metal, having electric conductivity. A specific material may be determined considering electric characteristics, structural stability, and the like. Further, the external electrodes 131 and 132 may have a multilayer structure.

For example, the external electrodes 131 and 132 may be a calcined electrode containing a conductive metal and glass or a resin electrode containing a conductive metal and a resin.

Additionally, the external electrodes 131 and 132 may be formed by an ALD method, a MLD method, a CVD method, a sputtering method, or the like.

The external electrodes 131 and 132 may also be formed by spraying a sheet containing a conductive metal on the body 110.

Based on FIG. 2, as a more specified example, the first external electrode 131 may include a first electrode layer 131a disposed to be in contact with the first internal electrode 121 and a first conductive resin layer 131b disposed on the first electrode layer 131a, and the second external electrode 132 may include a second electrode layer 132a disposed to be in contact with the second internal electrode 122, and a second conductive resin layer 132b disposed on the second electrode layer 132a.

The electrode layers 131a and 132a may contain a conductive metal and glass.

The conductive metal included in the electrode layers 131a and 132a is not particularly limited as long as a material thereof can be electrically connected to the internal electrodes for the generation of capacitance. For example, the conductive metal used in the electrode layers 131a and 132a may be at least one of nickel (Ni), copper (Cu), palladium (Pd), silver (Ag), gold (Au), platinum (Pt), tin (Sn), tungsten (W), titanium (Ti), or alloys thereof.

The conductive resin layers 131b and 132b may include a conductive metal and a base resin.

The conductive metal included in the conductive resin layers 131b and 132b facilitate an electrical connection with the electrode layers 131a and 132a.

The conductive metal included in the conductive resin layers 131b and 132b is not particularly limited as long as a material thereof can be electrically connected to the electrode layers 131a and 132a, and may be, for example, at least one of nickel (Ni), copper (Cu), palladium (Pd), silver (Ag), gold (Au), platinum (Pt), tin (Sn), tungsten (W), titanium (Ti), or alloys thereof.

The conductive metal included in the conductive resin layers 131b and 132b may include at least one of spherical type powder or flake type powder. That is, the conductive metal may consist of flake type powder only, spherical type powder only, or both flake type powder and spherical type powder being mixed.

The spherical type powder may not have a completely spherical shape, and for example, a shape whose length ratio of a major axis to a minor axis (major axis/minor axis) is 1.45 or less.

The flake type powder refers to powder having a flat and long shape, and although particularly not limited, but may have a major axis/minor axis length ratio of 1.95 or greater.

The lengths of the major and minor axes of the spherical and flake type powders may be measured from the image of an X and Z direction cross-section (L-T cross-section) cut through a central portion of the multilayer electronic component in the width (Y) direction, scanned using an SEM.

The base resin contained in the conductive resin layers 131b and 132b is not particularly limited as long as it has bondability and shock absorption and can be mixed with conductive metal powder to prepare a paste. For example, the base resin may be an epoxy resin.

Meanwhile, the external electrodes 131 and 132 may further include plating layers 131c and 132c disposed on the conductive resin layers 131b and 132b, respectively, to improve mounting properties.

The plating layers 131c and 132c are not particularly limited in terms of types, and may be a plating layer containing at least one of Ni, Sn, Pd, or alloys thereof. The plating layers 131c and 132c may be a multilayer structure.

For example, the plating layers 131c and 132c may include a Ni-plating layer and an Sn-plating layer disposed on the Ni-plating layer.

Meanwhile, the moisture-proof layer 117 may be disposed on all of the first, second, fifth and sixth surfaces 1, 2, 5, and 6 of the body 110. By being disposed on all of the first, second, fifth and sixth surfaces of the body 110, the moisture-proof layer 117 may have greatly improved moisture resistance reliability.

However, the moisture-proof layer 117 is not limited to dispose on all of the first, second, fifth and sixth surfaces of the body 110 in the present disclosure, and may be disposed only on the first surface, on the first and second surfaces, or on the fifth and sixth surfaces.

Figure 7:
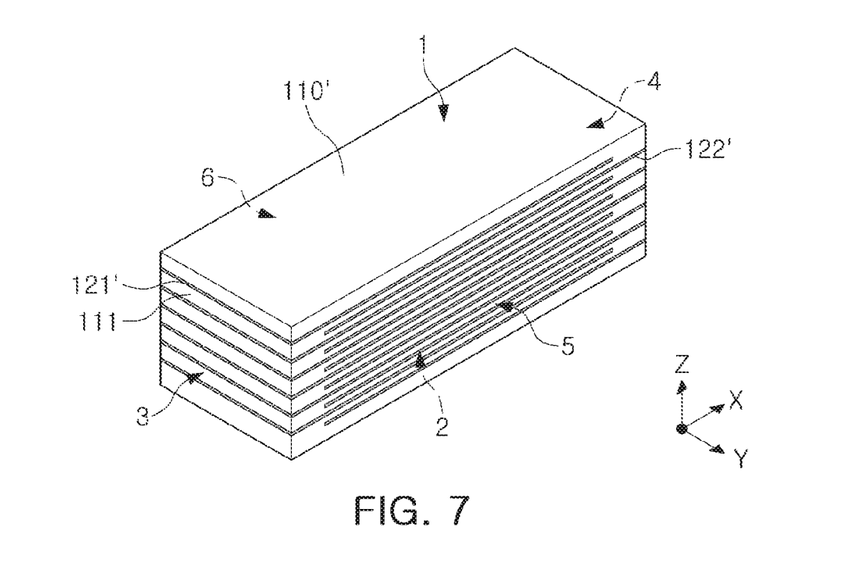
FIG. 7 is a perspective view schematically illustrating a body according to a modified example.
Figure 8:
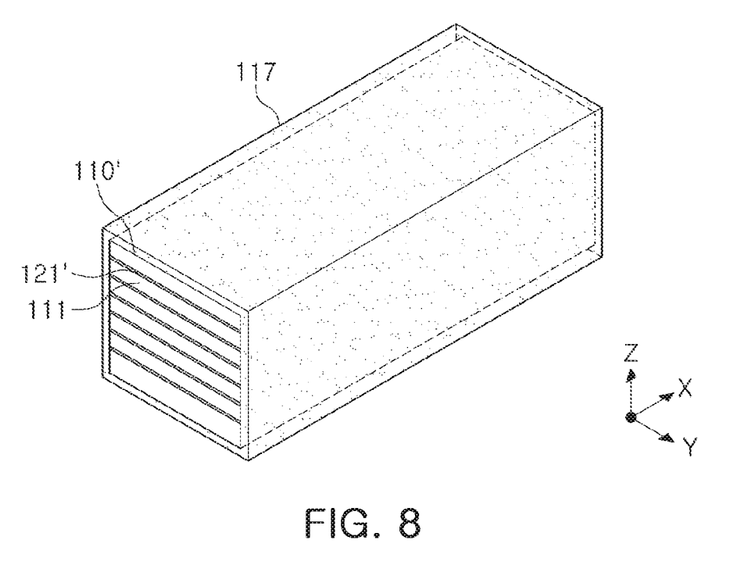
FIG. 8 is a perspective view schematically illustrating the body and a moisture-proof layer according to the modified example.

FIG. 7is a perspective view schematically illustrating a body 110' according to a modified example, and FIG. 8 is a perspective view schematically illustrating the body 110' and a moisture-proof layer 117 according to the modified example.

Based on FIGS. 7 and 8, the moisture-proof layer 117 may be disposed on the first, second, fifth and sixth surfaces 1, 2, 5, and 6 of the body 110, and a first internal electrode 121' may be spaced apart from the fourth surface 4 and may be exposed through the third, fifth and sixth surfaces 3, 5 and 6 while the second internal electrode 122' may be spaced apart from the third surface 3 and may be exposed through the fourth to sixth surfaces 4 to 6.

Accordingly, the first and second internal electrodes 121' and 122' exposed to the fifth and sixth surfaces 5 and 6 of the body 110' is covered by the moisture-proof layer 117 and thus protected from the outside of a multilayer electronic component.

In other words, the moisture-proof layer 117 performs a function of the margin portions 114 and 115 or the cover portions 112 and 113, thereby preventing the internal electrodes from being damaged by physical or chemical stress.

Further, since the moisture-proof layer 117 performs a function of the margin portions 114 and 115 or the cover portions 112 and 113, an overlapping surface area of the first and second internal electrodes 121' and 122' is maximized, and a capacitance per unit volume is increased.

One of the several effects of the present disclosure is to improve moisture resistance reliability by disposing a moisture-proof layer containing a rare-earth oxide in the body.

However, the various advantages of the present disclosure are not limited to the previous descriptions and will be more clearly understood from the embodiments.

While embodiments have been shown and described above, it will be apparent to those skilled in the art that modifications and variations could be made without departing from the scope of the present disclosure as defined by the appended claims.

What is claimed is:

1. A multilayer electronic component, comprising:
a body comprising a capacitance-generating portion including dielectric layers and first and second internal electrodes alternately laminated in one direction with respective dielectric layers interposed therebetween, and cover portions respectively disposed on an upper portion and a lower portion of the capacitance-generating portion, the body having first and second surfaces opposing each other in the one direction, third and fourth surfaces connected to the first and second surfaces and opposing each other, and fifth and sixth surfaces connected to the first to fourth surfaces and opposing each other;
a moisture-proof layer disposed on the first, second, fifth and sixth surfaces and consisting of a rare-earth oxide;
a first external electrode disposed on the third surface and connected to the first internal electrodes; and
a second external electrode disposed on the fourth surface and connected to the second internal electrodes,
wherein the first and second external electrodes cover at least a portion of the moisture-proof layer, and
a thickness of the moisture-proof layer is less than that of the cover portions.

2. The multilayer electronic component of claim 1, wherein the rare-earth oxide is at least one selected from dysprosium oxide ($Dy_2O_3$), cerium oxide ($CeO_2$), praseodymium oxide ($Pr_6O_{11}$), neodymium oxide ($Nd_2O_3$), samarium oxide ($Sm_2O_3$), europium oxide ($Eu_{203}$), gadolinium oxide ($Gd_2O_3$), terbium oxide ($Tb_4O_7$), holmium oxide ($Ho_2O_3$), erbium oxide ($Er_2O_3$), thulium oxide ($Tm_2O_3$), ytterbium oxide ($Yb_2O_3$), or lutetium oxide ($Lu_2O_3$).

3. The multilayer electronic component of claim 1, wherein the rare-earth oxide is $Dy_2O_3$.

4. The multilayer electronic component of claim 1, wherein a thickness of the moisture-proof layer is at least 100 nm.

5. The multilayer electronic component of claim 4, wherein the thickness of the moisture-proof layer is 100 μm or less.

6. The multilayer electronic component of claim 1, wherein the first internal electrodes are spaced out from the fourth surface of the body and is in contact with the third, fifth, and sixth surfaces, and
the second internal electrodes are spaced out from the third surface and is in contact with the fourth, fifth, and sixth surfaces.

7. The multilayer electronic component of claim 1, wherein the first internal electrodes are spaced out from the fourth, fifth, and sixth surfaces of the body and is exposed through the third surface, and
the second internal electrodes are spaced out from the third, fifth, and sixth surfaces and is exposed through the fourth surface.

8. The multilayer electronic component of claim 1, wherein the first external electrode comprises a first electrode layer in contact with the first internal electrodes, and a first conductive resin layer disposed on the first electrode layer, and
the second external electrode comprises a second electrode layer in contact with the second internal electrodes, and a second conductive resin layer disposed on the second electrode layer.

9. The multilayer electronic component of claim 8, wherein the first and second electrode layers comprise a conductive metal and glass.

10. The multilayer electronic component of claim 8, wherein the first and second conductive resin layers comprise a conductive metal and resin.

11. The multilayer electronic component of claim 8, further comprising a conductive layer disposed on each of the first and second conductive resin layers.

12. The multilayer electronic component of claim 1, wherein the moisture-proof layer is hydrophobic.

13. The multilayer electronic component of claim 1, wherein among the dielectric layers and the moisture-proof layer, the rare-earth oxide is contained only in the moisture-proof layer.

14. The multilayer electronic component of claim 1, wherein a weight percentage of a rare-earth oxide in the dielectric layers with respect to the total weight of the dielectric layers is less than a weight percentage of the rare-earth oxide in the moisture-proof layer with respect to the total weight of the moisture-proof layer.

15. The multilayer electronic component of claim 1, wherein an average thickness of the dielectric layers is 0.4 μm or less.

16. The multilayer electronic component of claim 1, wherein an average thickness of the first and second internal electrodes is 0.4 μm or less.

17. The multilayer electronic component of claim 1, wherein an average thickness of the dielectric layers is 0.4 μm or less, and
an average thickness of the first and second internal electrodes is 0.4 μm or less.

18. A multilayer electronic component, comprising:
a body comprising a capacitance-generating portion including dielectric layers and first and second internal electrodes alternately laminated in one direction with respective dielectric layers interposed therebetween, and cover portions respectively disposed on an upper portion and a lower portion of the capacitance-generating portion, the body having first and second surfaces opposing each other in the one direction, third and fourth surfaces connected to the first and second surfaces and opposing each other, and fifth and sixth surfaces connected to the first to fourth surfaces and opposing each other;
an oxide layer disposed on at least one surface of any one of the first, second, fifth or sixth surface, being spaced apart from the first and second internal electrodes, and consisting of a rare-earth oxide;
a first external electrode disposed on the third surface and connected to the first internal electrodes; and
a second external electrode disposed on the fourth surface and connected to the second internal electrodes,
wherein a thickness of the oxide layer is less than that of the cover portions.

19. The multilayer electronic component of claim 18, wherein the rare-earth oxide is at least one selected from dysprosium oxide ($Dy_2O_3$), cerium oxide ($CeO_2$), praseodymium oxide ($Pr_6O_{11}$), neodymium oxide ($Nd_2O_3$), samarium oxide ($Sm_2O_3$), europium oxide ($Eu_2O_3$), gadolinium oxide ($Gd_2O_3$), terbium oxide ($Tb_4O_7$), holmium oxide ($Ho_2O_3$), erbium oxide ($Er_2O_3$), thulium oxide ($Tm_2O_3$), ytterbium oxide ($Yb_2O_3$), or lutetium oxide ($Lu_2O_3$).

20. The multilayer electronic component of claim 18, wherein the rare-earth oxide is $Dy_2O_3$.

21. The multilayer electronic component of claim 18, wherein a thickness of the oxide layer is at least 100 nm.

22. The multilayer electronic component of claim 18, wherein the oxide layer further comprises a same material as the dielectric layers.

23. The multilayer electronic component of claim 18, wherein the oxide layer is disposed on all of the first, second, fifth and sixth surfaces.

24. The multilayer electronic component of claim 18, wherein the first external electrode comprises a first electrode layer in contact with the first internal electrodes, and a first conductive resin layer disposed on the first electrode layer, and
    the second external electrode comprises a second electrode layer in contact with the second internal electrodes, and a second conductive resin layer disposed on the second electrode layer.

25. The multilayer electronic component of claim 24, wherein the first and second electrode layers comprise a conductive metal and glass.

26. The multilayer electronic component of claim 18, wherein an average thickness of the dielectric layers is 0.4 µm or less.

27. The multilayer electronic component of claim 18, wherein an average thickness of the first and second internal electrodes is 0.4 µm or less.

28. The multilayer electronic component of claim 18, wherein an average thickness of the dielectric layers is 0.4 µm or less, and an average thickness of the first and second internal electrodes is 0.4 µm or less.

29. A multilayer electronic component, comprising:
    a body comprising a capacitance-generating portion including dielectric layers and first and second internal electrodes alternately laminated in one direction with respective dielectric layers interposed therebetween, and cover portions respectively disposed on an upper portion and a lower portion of the capacitance-generating portion, the body having first and second surfaces opposing each other in the one direction, third and fourth surfaces connected to the first and second surfaces and opposing each other, and fifth and sixth surfaces connected to the first to fourth surfaces and opposing each other;
    a moisture-proof layer disposed on at least one surface of any one of the first, second,
    fifth or sixth surface;
    a first external electrode disposed on the third surface and connected to the first internal electrodes; and
    a second external electrode disposed on the fourth surface and connected to the second internal electrodes,
    wherein the moisture-proof layer consists of a rare earth oxide,
    the rare-earth oxide is at least one selected from dysprosium oxide ($Dy_2O_3$), cerium oxide ($CeO_2$), praseodymium oxide ($Pr_6O_{11}$), neodymium oxide ($Nd_2O_3$), samarium oxide ($Sm_2O_3$), europium oxide ($Eu_{203}$), gadolinium oxide ($Gd_2O_3$), terbium oxide ($Tb_4O_7$), holmium oxide ($Ho_2O_3$), erbium oxide ($Er_2O_3$), thulium oxide ($Tm_2O_3$), ytterbium oxide ($Yb_2O_3$), or lutetium oxide ($Lu_2O_3$), and
    a thickness of the moisture-proof layer is less than that of the cover portions.

30. The multilayer electronic component of claim 29, wherein the rare-earth oxide is $Dy_2O_3$.

\* \* \* \* \*